(12) United States Patent
Okado

(10) Patent No.: US 12,735,895 B2
(45) Date of Patent: Sep. 15, 2026

(54) SNOW DROP PREVENTION STRUCTURE AND SNOW DROP PREVENTION TOOL

(71) Applicant: YANEGIJUTSUKENKYUJO CO., LTD., Takahama (JP)

(72) Inventor: Katsuyuki Okado, Takahama (JP)

(73) Assignee: YANEGIJUTSUKENKYUJO CO., LTD., Takahama (JP)

( * ) Notice: Subject to any disclaimer, the term of this patent is extended or adjusted under 35 U.S.C. 154(b) by 222 days.

(21) Appl. No.: 18/729,499

(22) PCT Filed: Mar. 15, 2022

(86) PCT No.: PCT/JP2022/011467

§ 371 (c)(1),
(2) Date: Jan. 13, 2025

(87) PCT Pub. No.: WO2023/175697

PCT Pub. Date: Sep. 21, 2023

(65) Prior Publication Data

US 2025/0341096 A1 Nov. 6, 2025

(51) Int. Cl.
*E04D 13/10* (2006.01)
*F24S 20/67* (2018.01)
(Continued)

(52) U.S. Cl.
CPC .............. *E04D 13/10* (2013.01); *H02S 40/00* (2013.01); *F24S 20/67* (2018.05); *H02S 30/10* (2014.12)

(58) Field of Classification Search
CPC ......... E04D 13/10; E04D 13/00; H02S 40/00; H02S 20/23; H02S 30/00; H02S 30/10;
(Continued)

(56) References Cited

U.S. PATENT DOCUMENTS 9,611,652 B2 * 4/2017 Haddock ................ H02S 20/00
10,622,935 B1 * 4/2020 Liu ........................ H02S 30/00
(Continued)

FOREIGN PATENT DOCUMENTS

JP 2012-82642 A 4/2012
JP 2015-45147 A 3/2015
(Continued)

OTHER PUBLICATIONS

International Search Report (ISR) for PCT/JP2022/011467, Mailed on Apr. 26, 2022, From Which the Current Application Claims Priority.

*Primary Examiner* — Phi D Tran
(74) *Attorney, Agent, or Firm* — Yoshida & Associates LLC; Kenichiro Yoshida

(57) ABSTRACT

A snow drop prevention tool (1) includes: a first member (10) having a first upright wall (11), a first securing section (12) extending from an upper end of the first upright wall (11), a first coupling section (13) extending toward an opposite side from the first upright wall (11), and a snow stopper (16) protruding upward from the first securing section (12); a second member (20) having a second upright wall (21), a second securing section (22) extending from an upper end of the second upright wall (21), and a second coupling section (23) extending above the first coupling section (13) from the second upright wall (21); and a bolt (30), the second coupling section (23) being provided with a long hole (24) through which the bolt (30) is inserted, the first coupling section (13) being provided with a female threaded hole (14) to which the bolt (30) is screwed.

3 Claims, 5 Drawing Sheets

(51) Int. Cl.
*H02S 30/10* (2014.01)
*H02S 40/00* (2014.01)

(58) Field of Classification Search
CPC . H02S 40/12; Y02B 10/10; E04H 9/16; F24S 20/67
See application file for complete search history.

(56) References Cited

U.S. PATENT DOCUMENTS

2013/0291479 A1* 11/2013 Schaefer ................ F24S 25/70 52/745.21
2013/0333305 A1* 12/2013 Stearns .................. F24S 25/67 52/24
2014/0158184 A1* 6/2014 West ...................... F24S 25/20 136/251
2015/0040967 A1* 2/2015 West .................... F16B 5/0004 403/345
2015/0288320 A1* 10/2015 Stearns .................. F24S 25/60 52/173.3
2016/0268958 A1* 9/2016 Wildes ................... H02S 20/23
2017/0104442 A1* 4/2017 MacRostie ............. H02S 20/23
2017/0237389 A1* 8/2017 Hudson ................ E04D 12/004 136/251
2019/0013772 A1* 1/2019 Bamat ...................... F16B 2/12
2019/0296689 A1* 9/2019 Haddock .............. F16B 5/0685
2021/0328540 A1* 10/2021 Wentworth ............. F24S 25/33
2022/0393635 A1* 12/2022 Eriksson ................ F24S 20/67
2024/0014770 A1* 1/2024 Moss ..................... H02S 20/22
2025/0080036 A1* 3/2025 Moss ..................... H02S 20/23

FOREIGN PATENT DOCUMENTS

JP 2015045128 A * 3/2015
JP 6181596 B2 11/2015
JP 2015209678 A * 11/2015
JP 2015209740 A * 11/2015
JP 6077324 B2 * 2/2017
JP 6181472 B2 * 8/2017
JP 2018137962 A * 8/2018
JP 2018-174695 A 11/2018
JP 2022041202 A * 3/2022
KR 102638307 B1 * 2/2024 ............ H02S 20/23
WO WO-2012096297 A1 * 7/2012 ............ H02S 20/23

* cited by examiner 1
30a
31
32
30b
30
22
23
24
40
16
17
11
12
26
27
21
25
28
13
20
10
15

30
30a
31
32
30b
1
10
16
11
14
17
20
23
22
12
24
21
13
27
15
26
28
40
25

1
30
30a
31
32
12
22
16
23
20
10
30b
21
11
24
26
17
40
P
P
52
52
54
13
14
54
51
51
28
50A
50B
27
55
55
25
53
15
53
L
W 10
16
1
20
12
30
22
P
24
30a
P
52
31
32
52
54
23
54
17
13
26
50A
40
55
55
51
14
51
30b
28
27
53
53
11
21
15
25

SNOW DROP PREVENTION STRUCTURE AND SNOW DROP PREVENTION TOOL

BACKGROUND OF THE INVENTION

Field of the Invention

The present invention relates to snow drop prevention structures for rooftops on which solar battery panels are installed, and to snow drop prevention tools used in such snow drop prevention structures.

Description of the Related Art

In order to suppress dropping of snow accumulated on a solar battery panel installed on a roof from the eaves of the roof, a snow drop prevention tool is attached. The snow drop prevention tool has a snow stopper that protrudes upward relative to the upper surface of the solar battery panel.

A snow drop prevention tool proposed by the present applicant includes a securing section that abuts on the upper surfaces of an eave-side solar battery panel and a ridge-side solar battery panel that are attached with a distance therebetween on a rooftop, a snow stopper protruding upward from the securing section, a sidewall extending below the bottom surface of the ridge-side solar battery panel from the securing section along an eave-side side surface of the solar battery panel, and a lower end extending below the ridge-side solar battery panel from the lower edge of the sidewall (Patent Literature 1). According to the technology in Patent Literature 1, the snow drop prevention tool can be attached by being inserted into a gap between the solar battery panels from above.

However, in the technology according to Patent Literature 1, if the gap between the solar battery panels or the height of the solar battery panels varies relative to the size of the snow drop prevention tool, it becomes difficult to attach the snow drop prevention tool. Thus, the snow drop prevention tool used needs to have a size that is compatible with the gap or height. Consequently, there is a demand for a technology for suppressing the dropping of accumulated snow by attaching a snow drop prevention tool regardless of the size of the gap between the solar battery panels or the height of the solar battery panels.

PTL 1: Japanese Patent No. 6181596

SUMMARY OF THE INVENTION

In view of the circumstances described above, an object of the present invention is to provide a snow drop prevention structure that can suppress dropping of snow accumulated on solar battery panels regardless of the size of the gap between the solar battery panels installed on a rooftop or the height of the solar battery panels, and a snow drop prevention tool used in the snow drop prevention structure.

In order to solve the aforementioned problems, a snow drop prevention structure according to the present invention includes a snow drop prevention tool attached on a rooftop on which solar battery panels are installed. In the snow drop prevention structure, the solar battery panels disposed adjacent to each other on the rooftop include a solar battery panel disposed at an eave side and a solar battery panel disposed at a ridge side, and a first frame and a second frame are fixed to a roof surface such that a gap is formed between the first frame and the second frame and below bottom surfaces of the first frame and the second frame, the first frame holding a ridge-side edge of the solar battery panel disposed at the eave side, the second frame holding an eave-side edge of the solar battery panel disposed at the ridge side. The snow drop prevention tool includes: a first member having a first upright wall extending downward along a side surface of the first frame from an area at an equal height as an upper end of the first frame, a first securing section that extends above the first frame from an upper edge of the first upright wall and that is in abutment with a top surface of the first frame, a first coupling section extending toward an opposite side of the first securing section from the first upright wall, and a snow stopper protruding upward from the first securing section; a second member having a second upright wall extending from an area at an equal height as an upper end of the second frame to an area below the second frame along a side surface of the second frame, a second securing section that extends above the second frame from an upper edge of the second upright wall and that is in abutment with a top surface of the second frame, a second coupling section extending toward an opposite side of the second securing section from the second upright wall and extending above or below the first coupling section, and a bottom extending section extending below the second frame from a lower edge of the second upright wall; and a bolt that fastens the first coupling section of the first member and the second coupling section of the second member to each other from above. If the second coupling section extends above the first coupling section, the first coupling section is provided with a female threaded hole to which a male threaded section of the bolt is screwed, the second coupling section is provided with a long hole through which the male threaded section is inserted, and the long hole is long in a direction in which the second coupling section extends from the second upright wall. If the second coupling section extends below the first coupling section, the second coupling section is provided with the female threaded hole to which the male threaded section of the bolt is screwed, the first coupling section is provided with the long hole through which the male threaded section is inserted, and the long hole is long in a direction in which the first coupling section extends from the first upright wall.

In the snow drop prevention structure having this configuration, if the second coupling section extends above the first coupling section, the first coupling section is provided with a female threaded hole to which the male threaded section of the bolt is screwed, the second coupling section is provided with the long hole through which the male threaded section is inserted, and the long hole is long in the direction in which the second coupling section extends from the second upright wall. On the other hand, if the second coupling section extends below the first coupling section, the second coupling section is provided with the female threaded hole to which the male threaded section of the bolt is screwed, the first coupling section is provided with the long hole through which the male threaded section is inserted, and the long hole is long in the direction in which the first coupling section extends from the first upright wall. In either case, the long hole through which the male thread is inserted is long in the direction in which the first coupling section extends or in the direction in which the second coupling section extends, that is, in a direction in which the first upright wall and the second upright wall are separated from each other. Therefore, by loosening the bolt, sliding within the length of the long hole in the longitudinal direction thereof becomes possible, so that the distance between the first upright wall and the second upright wall can be changed, whereby the distance between the first upright wall and the second upright wall can be adjusted to the gap between the first frame and the second frame.

Because the first securing section is in abutment with the top surface of the first frame and the second securing section is in abutment with the top surface of the second frame, the snow drop prevention tool does not fall downward through the gap between the first frame and the second frame. Because the snow stopper protrudes upward from the first securing section, the snow stopper can suppress dropping of snow accumulated on the solar battery panels.

Furthermore, the second upright wall extends to a location below the second frame, and the bottom extending section is provided at the lower end of the second upright wall, so that even when the snow drop prevention tool is lifted upward, the bottom extending section comes into abutment with the bottom surface of the second frame, thereby preventing the snow drop prevention tool from falling out. Therefore, the snow drop prevention tool having this configuration is compatible with the height of the first frame and the second frame of the solar battery panels so long as the height is smaller than the distance from the second securing section to the bottom extending section.

Accordingly, the snow drop prevention structure having this configuration can suppress dropping of snow accumulated on the solar battery panels installed on the rooftop regardless of the size of the gap between the solar battery panels or the height of the solar battery panels. Therefore, when constructing the snow drop prevention structure, it is not necessary to prepare a snow drop prevention tool of a different size for every size of the gap between the solar battery panels or every height of the solar battery panels, thereby reducing the cost required for snow drop prevention.

In addition to the above configuration, the snow drop prevention structure according to the present invention may be characterized in that the snow drop prevention tool further includes an adhesive member that bonds the second upright wall of the second member and the side surface of the second frame to each other.

Examples of the "adhesive member" include a "butyl rubber sheet having adhesiveness", "double-sided adhesive tape", and a "bonding agent".

According to this configuration, the second upright wall of the second member and the side surface of the second frame are bonded to each other by using the adhesive member, so that the snow drop prevention tool can be prevented from moving upward relative to the solar battery panels or from moving in the longitudinal direction of the second frame. Accordingly, the snow drop prevention tool can be continuously maintained at a desired position relative to the solar battery panels.

Furthermore, because the second upright wall and the side surface of the second frame are bonded to each other by using the adhesive member, peeling of the adhesive member is less likely to occur.

A snow drop prevention tool according to the present invention includes: a first member having a first upright wall extending in an up-down direction, a first securing section extending from an upper edge of the first upright wall, a first coupling section extending toward an opposite side of the first securing section from the first upright wall, and a snow stopper protruding upward from the first securing section; a second member having a second upright wall extending in the up-down direction with a distance from the first upright wall, a second securing section extending toward an opposite side of the first upright wall from an upper edge of the second upright wall, a second coupling section extending above or below the first coupling section from the second upright wall, and a bottom extending section extending in an identical direction as the second securing section from a lower edge of the second upright wall; and a bolt that fastens the first coupling section of the first member and the second coupling section of the second member to each other from above. If the second coupling section extends above the first coupling section, the first coupling section is provided with a female threaded hole to which a male threaded section of the bolt is screwed, the second coupling section is provided with a long hole through which the male threaded section is inserted, and the long hole is long in a direction in which the second coupling section extends from the second upright wall. If the second coupling section extends below the first coupling section, the second coupling section is provided with the female threaded hole to which the male threaded section of the bolt is screwed, the first coupling section is provided with the long hole through which the male threaded section is inserted, and the long hole is long in a direction in which the first coupling section extends from the first upright wall.

The "up-down direction" is the up-down direction in a state where the snow drop prevention tool is being used (i.e., a state where the snow drop prevention tool is attached to a rooftop). Because the snow drop prevention tool is to be attached to a roof that is inclined downward from the ridge toward an eave, the "up-down direction" does not refer to the vertical direction.

In the snow drop prevention tool having this configuration, if the second coupling section extends above the first coupling section, the first coupling section is provided with a female threaded hole to which the male threaded section of the bolt is screwed, the second coupling section is provided with the long hole through which the male threaded section is inserted, and the long hole is long in the direction in which the second coupling section extends from the second upright wall. On the other hand, if the second coupling section extends below the first coupling section, the second coupling section is provided with the female threaded hole to which the male threaded section of the bolt is screwed, the first coupling section is provided with the long hole through which the male threaded section is inserted, and the long hole is long in the direction in which the first coupling section extends from the first upright wall. Thus, in either case, the long hole through which the male thread is inserted is long in the direction in which the first coupling section extends or in the direction in which the second coupling section extends, that is, in a direction in which the first upright wall and the second upright wall are separated from each other. Therefore, by loosening the bolt, sliding within the long hole in the longitudinal direction thereof becomes possible, so that the distance between the first upright wall and the second upright wall can be changed, whereby the distance between the lower ends of the first member and the second member can be reduced.

When the head of the bolt is set upward largely away from the first coupling section or the second coupling section provided with the female threaded hole by loosening the bolt to an extent that the male threaded section of the bolt does not fall out of the female threaded hole, the first member and the second member become rotatable relative to each other within the range of the length of the long hole. In a state where the first coupling section and the second coupling section are provided in areas above the lower ends of the first upright wall and the second upright wall, desirably, in areas close to the upper ends of the first upright wall and the second upright wall, and the bolt is largely loosened as described above, when the first member and the second member are relatively rotated in directions in which the lower ends thereof move toward each other, the distance between the lower ends can be reduced, as compared with a state where the first upright wall and the second upright wall are parallel to each other.

Accordingly, in the snow drop prevention tool having this configuration, the distance between the lower ends of the first member and the second member can be reduced relative to the size of the gap between the first frame of the eave-side solar battery panel and the second frame of the ridge-side solar battery panel by loosening the bolt.

Therefore, when the snow drop prevention tool having this configuration is to be used, the snow drop prevention tool is inserted from above into the gap between the first frame and the second frame in a state where the distance between the lower ends of the first member and the second member is smaller than the gap between the first frame and the second frame, and the bottom extending section at the lower end is made to protrude into the gap below the bottom surfaces of the second frame. Then, the first upright wall and the second upright wall are slid away from each other to bring the first upright wall into abutment with the side surface of the first frame and to bring the second upright wall into abutment with the side surface of the second frame. In this state, the bolt is tightened to fasten the first coupling section and the second coupling section to each other. Accordingly, the above-described snow drop prevention structure can be constructed, and advantages similar to the above can be exhibited.

Because the snow drop prevention tool can be attached by being inserted from above into the gap between the first frame and the second frame of the solar battery panels installed on the rooftop, the snow drop prevention tool can be attached without having to detach the solar battery panels from the rooftop, thereby reducing the time and effort used for attaching the snow drop prevention tool.

Accordingly, the present invention can provide a snow drop prevention structure that can suppress dropping of snow accumulated on solar battery panels regardless of the size of the gap between the solar battery panels installed on a rooftop or the height of the solar battery panels, and a snow drop prevention tool used in the snow drop prevention structure.

DESCRIPTION OF THE EMBODIMENTS

Figure 1A:
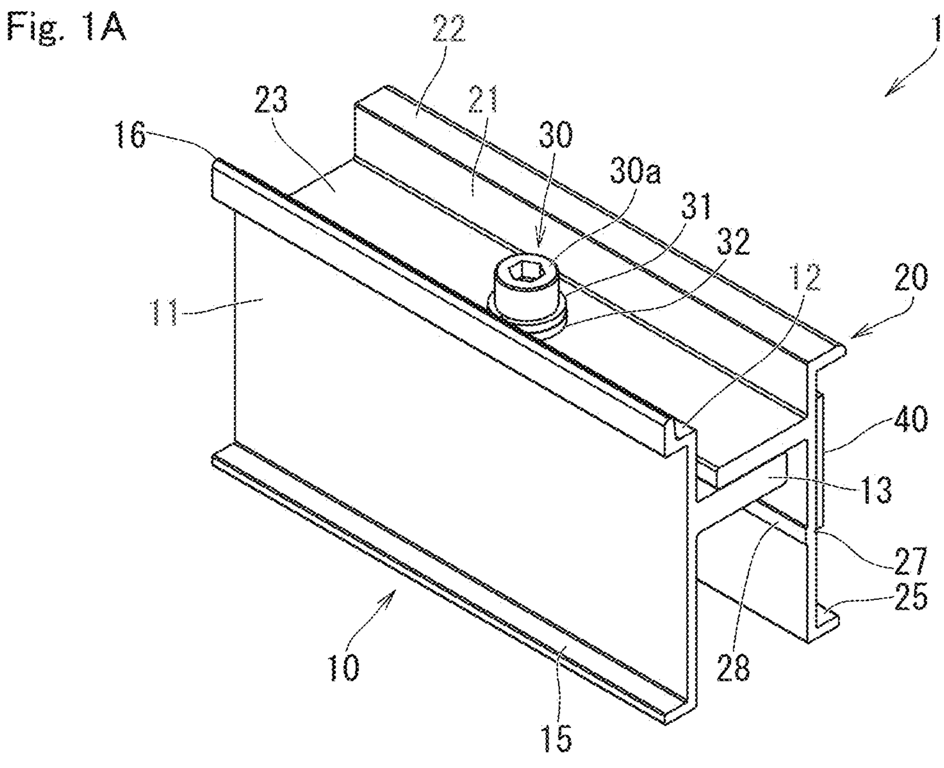
FIG. 1A is a perspective view of a snow drop prevention tool according to an embodiment of the present invention, as viewed from the front side.
Figure 1B:
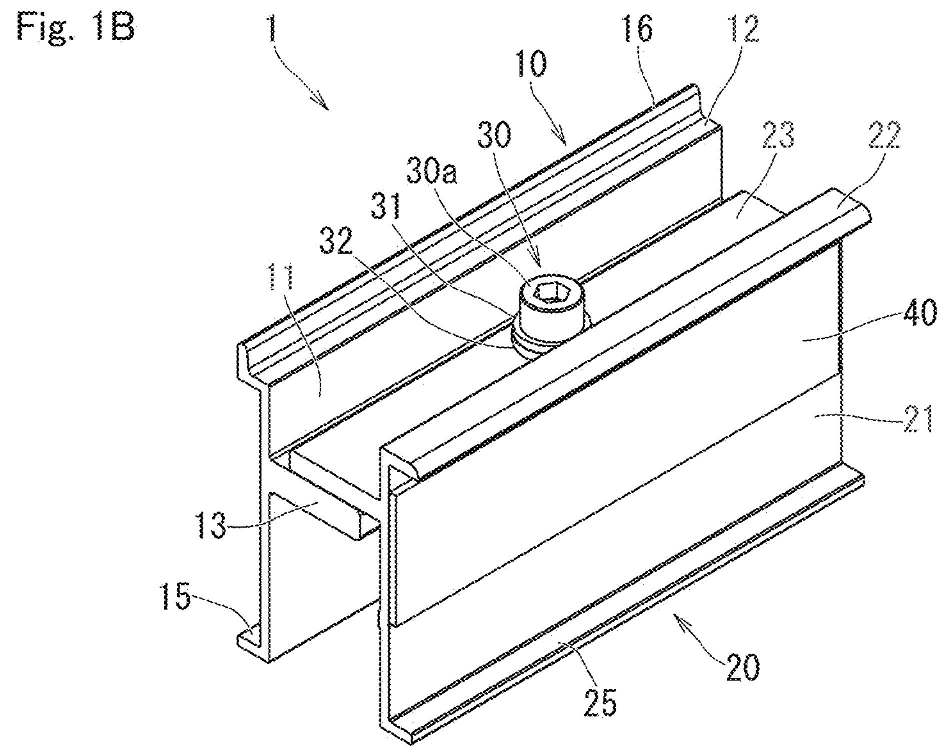
FIG. 1B is a perspective view of the snow drop prevention tool in FIG. 1A, as viewed from the rear side.
Figures 2A, 2B:
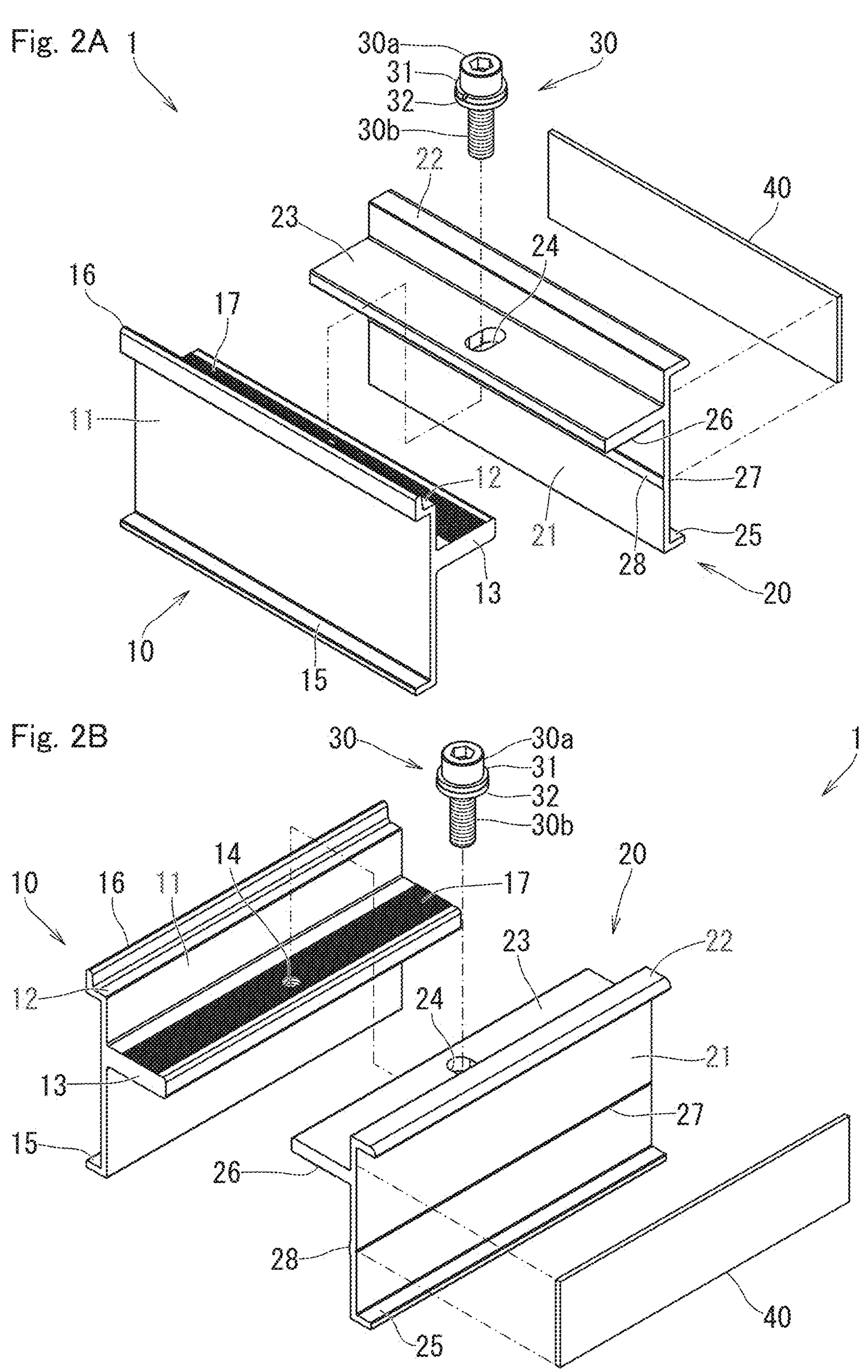
FIG. 2A is an exploded perspective view of the snow drop prevention tool in FIGS. 1A and 1B, as viewed from the front side.
FIG. 2B is an exploded perspective view of the snow drop prevention tool in FIG. 2A, as viewed from the rear side.
Figure 3:
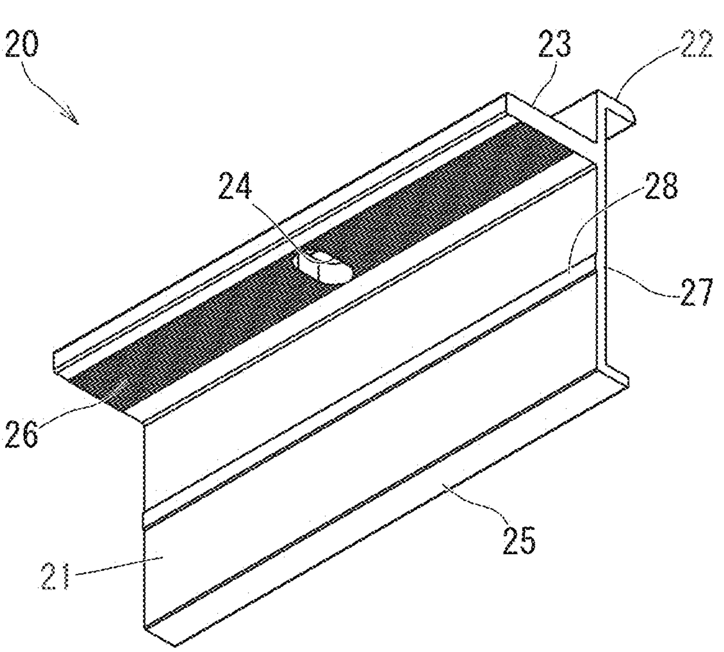
FIG. 3 is a perspective view of a second member of the snow drop prevention tool in FIGS. 1A and 1B, as viewed from below.
Figures 4A, 4B:
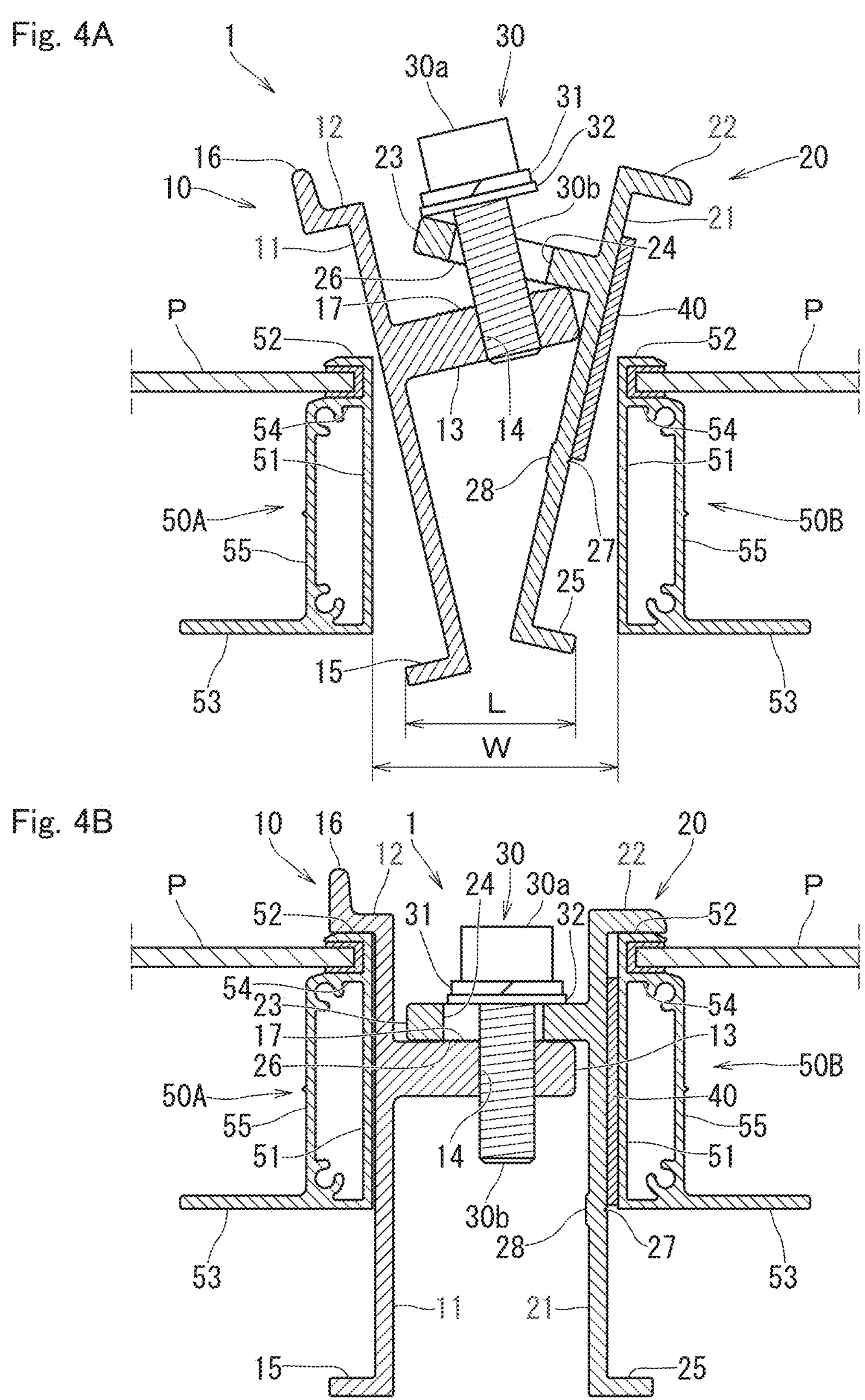
FIG. 4A is a cross-sectional view illustrating how the snow drop prevention tool in FIGS. 1A and 1B is attached to a first frame and a second frame.
FIG. 4B is a cross-sectional view of a snow drop prevention structure equipped with the snow drop prevention tool in FIGS. 1A and 1B.

A snow drop prevention tool 1 according to an embodiment of the present invention and a snow drop prevention structure equipped with the snow drop prevention tool 1 will be described below in detail with reference to FIGS. 1 to 5. The snow drop prevention tool 1 includes a first member 10, a second member 20, a bolt 30 that fastens the first member 10 and the second member 20 to each other, and an adhesive member 40 bonded to the second member 20.

The first member 10 has a tabular first upright wall 11 extending in the up-down direction, a first securing section 12 extending orthogonally from the upper edge of the first upright wall 11, a first coupling section 13 extending orthogonally toward the opposite side of the first securing section 12 from an intermediate location of the first upright wall 11 in the up-down direction, and a female threaded hole 14 having a female thread in the inner peripheral surface thereof and extending through the first coupling section 13. The first upright wall 11 extends longer in the up-down direction than the height from a top surface 52 to a bottom surface 53 of a first frame 50A, to be described later. The first coupling section 13 extends from the first upright wall 11 by a length greater than that of the first securing section 12.

The first member 10 further has a bottom extending section 15 extending in the same direction as the first securing section 12 from the lower edge of the first upright wall 11, a snow stopper 16 extending upward from the first securing section 12, and an anti-slip section 17 provided at the upper surface of the first coupling section 13. The bottom extending section 15 extends from the first upright wall 11 by a length smaller than that of the first securing section 12. The snow stopper 16 extends upward from an edge of the first securing section 12 located opposite the first upright wall 11. The anti-slip section 17 is formed of a plurality of wave-like protrusions and recesses extending in a direction orthogonal to the direction in which the first coupling section 13 extends (see FIG. 2).

The second member 20 has a tabular second upright wall 21 extending in the up-down direction, a second securing section 22 extending orthogonally from the upper edge of the second upright wall 21, a second coupling section 23 extending orthogonally toward the opposite side of the second securing section 22 from an intermediate location of the second upright wall 21 in the up-down direction, and a long hole 24 that extends through the second coupling section 23 and that is long in the direction in which the second coupling section 23 extends. The second upright wall 21 has the same length in the up-down direction as the first upright wall 11. The second coupling section 23 extends from the second upright wall 21 by a length greater than that of the second securing section 22.

The second member 20 further has a bottom extending section 25 extending in the same direction as the second securing section 22 from the lower edge of the second upright wall 21, an anti-slip section 26 provided at the lower surface of the second coupling section 23, a positioning section 27 provided at a surface of the second upright wall 21 oriented in the direction in which the second securing section 22 extends, and a bulging section 28 bulging from a surface of the second upright wall 21 located opposite the positioning section 27.

The bottom extending section 25 extends from the second upright wall 21 by a length smaller than that of the second securing section 22. The anti-slip section 26 is formed of a plurality of wave-like protrusions and recesses extending in a direction orthogonal to the direction in which the second coupling section 23 extends (see FIG. 3). The positioning section 27 is formed of a V-shaped groove extending parallel to the upper edge of the second upright wall 21 and provided in an area of the second upright wall 21 located lower than the second coupling section 23. The positioning section 27 is provided for setting the bonding position of the adhesive member 40. Using the positioning section 27 as a guide facilitates the bonding of the adhesive member 40. The bulging section 28 prevents the thickness of the area of the positioning section 27 in the second upright wall 21 from being smaller than that of other areas.

A bolt 30 has a head 30*a* and a male threaded section 30*b* having a male thread in the outer peripheral surface thereof and extending from the head 30*a*. The male threaded section 30*b* of the bolt 30 is inserted through the long hole 24 in the second coupling section 23 of the second member 20 from above and is screwed to the female threaded hole 14 in the first coupling section 13 of the first member 10. By tightening this bolt 30, the first coupling section 13 of the first member 10 and the second coupling section 23 of the second member 20 can be fastened to each other. A spring washer 31 and a flat washer 32 are fitted around an area of the male threaded section 30*b* between the head 30*a* and the second coupling section 23.

The adhesive member 40 is sheet-like. The adhesive member 40 is bonded to an area above the positioning section 27 on the surface provided with the positioning section 27 on the second upright wall 21 of the second member 20. Although not shown, release paper is bonded to the surface of the adhesive member 40 opposite the second upright wall 21. This release paper is provided for protecting the adhesive member 40 when the snow drop prevention tool 1 is being stored or transported.

With regard to the snow drop prevention tool 1 according to this embodiment, the first member 10 and the second member 20 are combined with each other by inserting the male threaded section 30*b* of the bolt 30 through the long hole 24 from above and screwing and tightening the male threaded section 30*b* to the female threaded hole 14 in a state where the surface of the first upright wall 11 from which the first coupling section 13 extends and the surface of the second upright wall 21 from which the second coupling section 23 extends face each other and the second coupling section 23 is positioned above the first coupling section 13, In this state, the first securing section 12 and the second securing section 22 are set at the same height. Moreover, in this state, the head 30*a* of the bolt 30 does not protrude from the upper surfaces of the first securing section 12 and the second securing section 22. In other words, when the snow drop prevention tool 1 is assembled, the first coupling section 13 and the second coupling section 23 are provided at a height where the head 30*a* of the bolt 30 does not protrude above the first securing section 12 and the second securing section 22.

Each of the first member 10 and the second member 20 according to this embodiment is integrally molded by using metal, such as aluminum, or synthetic resin. For example, each of the first member 10 and the second member 20 may be an extrusion-molded long member having a uniform shape in cross section orthogonal to the extrusion direction and cut to a desired length. In a case where the first member 10 and the second member 20 are composed of synthetic resin, there is no risk of an electric shock by coming into contact with the snow drop prevention tool 1 even when electrical leakage occurs. The bolt 30 according to this embodiment is a hexagon socket head bolt composed of stainless steel. The adhesive member 40 according to this embodiment is a butyl rubber sheet.

In the snow drop prevention tool 1 according to this embodiment, the first upright wall 11 and the second upright wall 21 each have a thickness of 2 mm. The height between the first securing section 12 and the bottom extending section 15 and the height between the second securing section 22 and the bottom extending section 25 are 49 mm. The length from the first upright wall 11 to the distal end of the first coupling section 13 and the length from the second upright wall 21 to the distal end of the second coupling section 23 are 20 mm. The height from the upper surface of the first securing section 12 to the upper surface of the first coupling section 13 is 14 mm, and the height from the upper surface of the second securing section 22 to the upper surface of the second coupling section 23 is 10 mm. The thickness of the first coupling section 13 is 5 mm, and the thickness of the second coupling section 23 is 4 mm. Furthermore, the length by which the bolt 30 is slidable in the long hole 24 is 5 mm. The length from the first upright wall 11 to the distal end of the bottom extending section 15 and the length from the second upright wall 21 to the distal end of the bottom extending section 25 is 4 mm. The length in the direction in which each of the first member 10 and the second member 20 extends with the uniform shape is between 80 mm and 120 mm. With the snow drop prevention tool 1 having the above dimensions, if a gap W between the first frame 50A and a second frame 50B is within a range between 27 mm and 30 mm and the height of each of the first frame 50A and the second frame 50B is within a range between 30 mm and 46 mm, a snow drop prevention structure, to be described in detail later, can be constructed without having to disassemble the snow drop prevention tool 1.

Figure 5:
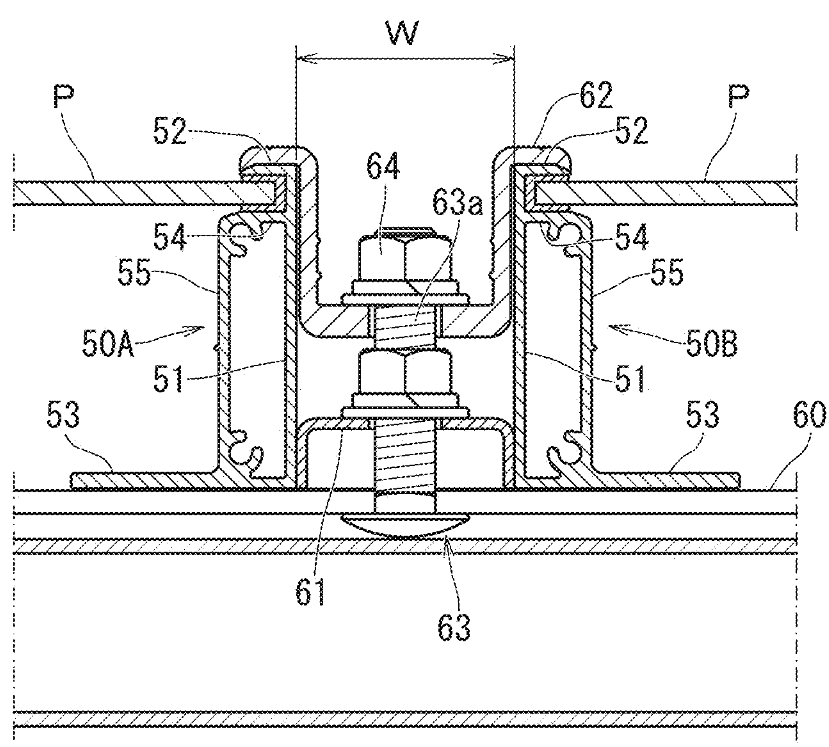
FIG. 5 is a cross-sectional view illustrating an example where a first frame and a second frame holding solar battery panels are fixed to a base by using a fixing member.

Next, a method for constructing the snow drop prevention structure according to this embodiment equipped with the snow drop prevention tool 1 will be described with reference to FIGS. 4 and 5. Of solar battery panels P disposed adjacent to each other on a rooftop, the snow drop prevention tool 1 is attached to the first frame 50A holding the ridge-side edge of the solar battery panel P disposed at the eave side and to the second frame 50B holding the eave-side edge of the solar battery panel P disposed at the ridge side, whereby the snow drop prevention structure can be constructed.

First, the first frame 50A and the second frame 50B will be described. The first frame 50A and the second frame 50B have the same configuration and are distinguished from each other only with respect to the positional relationship with the snow drop prevention tool 1. In detail, each of the first frame 50A and the second frame 50B includes a tabular side surface 51 extending in the up-down direction, a top surface 52 extending orthogonally from the upper edge of the side surface 51, a bottom surface 53 extending in the same direction as the top surface 52 from the lower edge of the side surface 51, a lower holder section 54 extending below the top surface 52 from the side surface 51 in the same direction as the top surface 52, and a reinforcement section 55 that extends parallel to the side surface 51 and that couples the lower holder section 54 and the bottom surface 53 to each other. Each of the first frame 50A and the second frame 50B holds the edge of the corresponding solar battery panel P between the top surface 52 and the lower holder section 54. Each of the first frame 50A and the second frame 50B is a long member having a uniform shape in cross section orthogonal to the direction extending along the edge of the corresponding solar battery panel P, and can be formed by extrusion-molding metal, such as aluminum.

The first frame 50A and the second frame 50B described above are fixed to a roof surface such that a gap is formed therebetween and below the bottom surfaces 53 thereof. Specifically, as shown in FIG. 5, the first frame 50A and the second frame 50B are fixed to a base 60 serving as a long bar attached to the roof surface. A spacer 61 is disposed on the base 60. The first frame 50A and the second frame 50B with the spacer 61 interposed therebetween are placed on the base 60 such that the side surfaces 51 abut on the spacer 61, and a pressing member 62 abuts on the top surfaces 52 of the first frame 50A and the second frame 50B. A male threaded section 63*a* of a bolt 63 extends upward through the spacer 61 and the pressing member 62 from the base 60, and a nut 64 screwed to the distal end (upper end) of the male threaded section 63*a* is tightened. Accordingly, the first frame 50A and the second frame 50B are fixed while being pressed against the base 60 via the pressing member 62.

By being fixed in this manner, the first frame 50A and the second frame 50B have a gap therebetween with the same width as the spacer 61. In other words, the gap W between the first frame 50A and the second frame 50B is set in accordance with the spacer 61. Furthermore, because the first frame 50A and the second frame 50B are partially placed on the base 60, a gap is formed below the respective bottom surfaces 53 where there is no base 60.

In the example described above, the size of the gap W between the first frame 50A and the second frame 50B is set in accordance with the spacer 61. Alternatively, the pressing member 62 may be provided with an area that protrudes between the first frame 50A and the second frame 50B, and the side surfaces 51 of the first frame 50A and the second frame 50B may be brought into abutment with this area, thereby setting the size of the gap between the first frame 50A and the second frame 50B.

Because the first frame 50A and the second frame 50B that hold the solar battery panels P are fixed on the rooftop, as described above, the size of the gap W between the first frame 50A and the second frame 50B varies depending on the sizes of, for example, the spacer 61 and the pressing member 62.

The following description relates to how the snow drop prevention tool 1 is attached to the first frame 50A and the second frame 50B. First, the release paper (not shown) protecting the adhesive member 40 is removed. Then, the bolt 30 is rotated in the loosening direction, so that the head 30*a* is set upward largely away from the first coupling section 13 to an extent that the male threaded section 30*b* does not fall out of the female threaded hole 14 in the first coupling section 13. In this state, a force is applied to bring the lower end of the first member 10 and the lower end of the second member 20 closer to each other, so that the second member 20 rotates relative to the first member 10 about a portion of the second member 20 that is in abutment with the distal end of the first coupling section 13, whereby the lower ends of the first member 10 and the second member 20 are brought closer to each other (see FIG. 4A).

The relative rotation in the direction in which the lower ends of the first member 10 and the second member 20 are brought closer toward each other is regulated and stopped as a result of the male threaded section 30*b* coming into abutment with an inner peripheral end of the long hole 24 located toward the distal end of the second coupling section 23.

In the state where the lower ends of the first member 10 and the second member 20 are brought closer to each other, a distance L from the distal end of the bottom extending section 15 to the distal end of the bottom extending section 25 is smaller than the gap W between the first frame 50A and the second frame 50B. The distance between the upper ends of the first upright wall 11 and the second upright wall 21 is larger than the gap W between the first frame 50A and the second frame 50B. In this state, with the first member 10 oriented toward the eave side, the snow drop prevention tool 1 is inserted into the gap between the first frame 50A and the second frame 50B from above.

Then, the snow drop prevention tool 1 is moved downward so that the lower end thereof is positioned in the gap below the bottom surfaces 53 of the first frame 50A and the second frame 50B. When the snow drop prevention tool 1 is moved further downward, the first upright wall 11 and the second upright wall 21 respectively come into abutment with the first frame 50A and the second frame 50B. When the snow drop prevention tool 1 is moved further downward from this state, the lower ends of the first member 10 and the second member 20 rotate away from each other about the areas where they are respectively in abutment with the first frame 50A and the second frame 50B.

When the first upright wall 11 and the second upright wall 21 become parallel to each other as a result of this rotation, the second securing section 22 is brought into abutment with the top surface 52 of the second frame 50B, and the second upright wall 21 is brought closer toward the side surface 51 of the second frame 50B. Then, the adhesive member 40 is bonded to the side surface 51 of the second frame 50B. Moreover, the first securing section 12 of the first member 10 is brought into abutment with the top surface 52 of the first frame 50A, and the first upright wall 11 is brought into abutment with the side surface 51 of the first frame 50A.

Subsequently, the bolt 30 is tightened to fasten the first coupling section 13 and the second coupling section 23 to each other, so that the snow drop prevention tool 1 becomes attached to the first frame 50A and the second frame 50B (see FIG. 4(*b*)). In this state, the head 30*a* of the bolt 30 is located lower than the upper surfaces of the first securing section 12 and the second securing section 22, so that the head 30*a* does not shadow the solar battery panel P at the ridge side. Moreover, in this state, the protrusions and recesses of the anti-slip section 17 provided at the upper surface of the first coupling section 13 and the protrusions and recesses of the anti-slip section 26 provided at the lower surface of the second coupling section 23 are engaged with each other, so that slippage does not occur between the first coupling section 13 and the second coupling section 23. The snow drop prevention tool 1 is attached to the first frame 50A and the second frame 50B in this manner, whereby the snow drop prevention structure is constructed.

The above description relates to an example where the insertion into the gap between the first frame 50A and the second frame 50B is performed in the state where the distance between the first upright wall 11 and the second upright wall 21 is decreased downward by relatively rotating the first member 10 and the second member 20. Alternatively, depending on the size of the gap W between the first frame 50A and the second frame 50B, the insertion into the gap between the first frame 50A and the second frame 50B may be performed in a state where the first upright wall 11 and the second upright wall 21 are set with a small distance therebetween while being maintained parallel to each other by performing sliding within the length of the long hole 24 in the longitudinal direction thereof.

In the snow drop prevention tool 1 according to this embodiment, the hole through which the male threaded section 30*b* of the bolt 30 is inserted is the long hole 24 that is long in the direction in which the first upright wall 11 and the second upright wall 21 are separated from each other, Therefore, by loosening the bolt 30, the sliding within the long hole 24 in the longitudinal direction thereof becomes possible. Accordingly, the distance between the first upright wall 11 and the second upright wall 21 can be changed, so that the distance between the first upright wall 11 and the second upright wall 21 can be adjusted to the size of the gap W between the first frame 50A and the second frame 50B.

Furthermore, the first securing section 12 is in abutment with the top surface 52 of the first frame 50A, and the second securing section 22 is in abutment with the top surface 52 of the second frame 50B, so that the snow drop prevention tool 1 does not fall downward through the gap between the first frame 50A and the second frame 50B.

In the snow drop prevention tool 1 according to this embodiment, the snow stopper 16 protrudes upward from the first securing section 12, so that the snow stopper 16 can suppress dropping of snow accumulated on the solar battery panels P. In this snow drop prevention tool 1, the snow stopper 16 protrudes upward from the first securing section 12 of the first member 10 at the eave side, so that the snow stopper 16 is less likely to shadow the solar battery panel P at the ridge side, thereby preventing the power generation efficiency of the solar battery panel P from decreasing.

Furthermore, the first upright wall 11 and the second upright wall 21 extend to locations below the first frame 50A and the second frame 50B, and the bottom extending sections 15 and 25 are respectively provided at the lower ends of the first upright wall 11 and the second upright wall 21, so that even when the snow drop prevention tool 1 is lifted upward, the bottom extending section 15 and the bottom extending section 25 come into abutment with the bottom surfaces 53 of the first frame 50A and the second frame 50B, thereby preventing the snow drop prevention tool 1 from falling out. Therefore, the snow drop prevention tool 1 according to this embodiment is compatible with the height of the first frame 50A and the second frame 50B of the solar battery panels P so long as the height is smaller than the distance from the first securing section 12 and the second securing section 22 to the bottom extending sections 15 and 25, respectively.

Furthermore, because the second upright wall 21 of the second member 20 is bonded to the side surface 51 of the second frame 50B by using the adhesive member 40, the snow drop prevention tool 1 can be prevented from moving upward relative to the solar battery panels P or from moving in the longitudinal direction of the first frame 50A and the second frame 50B. Accordingly, the snow drop prevention tool 1 can be continuously maintained at a desired position relative to the solar battery panels P.

Moreover, because the second upright wall 21 and the side surface 51 of the second frame 50B are bonded to each other by using the adhesive member 40, peeling of the adhesive member 40 is less likely to occur. Specifically, because the first securing section 12 of the first member 10 at the eave side is provided with the snow stopper 16, the snow stopper 16 receives a force acting toward the eave side due to snow accumulated on the solar battery panels P. When the snow stopper 16 receives the force acting toward the eave side, the first member 10 tends to rotate about near the upper edge of the side surface 51 of the first frame 50A in a direction in which the lower end of the first upright wall 11 moves toward the ridge side. This rotational force is also transmitted to and acts on the second member 20 fastened by the bolt 30, so that the lower end of the second upright wall 21 also tends to move toward the ridge side. In this case, because the ridge side of the second upright wall 21 is provided with the side surface 51 of the second frame 50B with the adhesive member 40 interposed therebetween, the adhesive member 40 is pressed onto the side surface 51 by the second upright wall 21 and receives a compressive force. Accordingly, peeling of the adhesive member 40 is less likely to occur, as compared with a case where it receives a tensile force.

Furthermore, when the head 30*a* of the bolt 30 is set largely away from the first coupling section 13 provided with the female threaded hole 14 by loosening the bolt 30 to an extent that the male threaded section 30*b* of the bolt 30 does not fall out of the female threaded hole 14, the first member 10 and the second member 20 become rotatable relative to each other within the range of the length of the long hole 24. In this state, the first member 10 and the second member 20 are relatively rotated in directions in which the lower ends thereof move toward each other, so that the distance between the lower ends can be decreased, as compared with a state where the first upright wall 11 and the second upright wall 21 are parallel to each other. Accordingly, the snow drop prevention tool 1 can be attached by being inserted from above into the gap between the first frame 50A and the second frame 50B of the solar battery panels P installed on the rooftop, so that the snow drop prevention tool 1 can be attached without having to detach the solar battery panels P from the rooftop, thereby reducing the time and effort used for attaching the snow drop prevention tool 1.

Furthermore, because the upper surface of the first coupling section 13 and the lower surface of the second coupling section 23 are respectively provided with the anti-slip sections 17 and 26, the engagement between the two can prevent relative sliding between the first coupling section 13 and the second coupling section 23 even if the bolt 30 is somewhat loosened, whereby detachment of the snow drop prevention tool 1 is less likely to occur.

Because the second coupling section 23 of the ridge-side second member 20 is in abutment from above with the first coupling section 13 of the eave-side first member 10 provided with the snow stopper 16, detachment of the snow drop prevention tool 1 is less likely to occur even when the snow stopper 16 receives a force acting toward the eave side due to snow accumulated on the solar battery panels P. Specifically, when the snow stopper 16 of the first member 10 receives the force acting toward the eave side, the first member 10 tends to rotate about near the upper edge of the side surface 51 of the first frame 50A such that the lower end of the first upright wall 11 moves toward the ridge side. In other words, the distal end of the first coupling section 13 extending toward the ridge side from the first upright wall 11 tends to move upward. In this case, because the second coupling section 23 of the second member 20 is in abutment with the first coupling section 13 from above, upward movement of the first coupling section 13 is suppressed by the weight of the second member 20. Moreover, because the second member 20 is bonded to the second frame 50B by using the adhesive member 40, the upward movement of the first coupling section 13 is also inhibited by the resistance of the adhesive member 40. Accordingly, the first coupling section 13 does not move upward even when the show stopper 16 is pressed toward the eave side due to snow accumulated on the solar battery panels P, thereby preventing the snow drop prevention tool 1 from falling out.

Although the present invention has been described above with reference to a preferred embodiment, the present invention is not limited to the above embodiment, and various improvements and design modifications are possible so long as they do not depart from the scope of the invention.

For example, in the above embodiment, each of the anti-slip sections 17 and 26 is formed of a plurality of wave-like protrusions and recesses. However, the configuration is not limited to this. For example, each of the anti-slip sections 17 and 26 may be formed of a plurality of pyramid-like protrusions and recesses. In this case, for example, the plurality of pyramid-like protrusions and recesses can be formed by knurling.

In the above embodiment, the first member 10 and the second member 20 of the snow drop prevention tool 1 respectively include the bottom extending sections 15 and 25. However, the configuration is not limited to this. The second member 20 alone may include a bottom extending section. In this case, in the first member 10 not equipped with a bottom extending section, the length of the first upright wall 11 may be the length from the first securing section 12 to the first coupling section 13.

Furthermore, in the above embodiment, the first member 10 alone is provided with the snow stopper 16. However, the configuration is not limited to this. The first member 10 and the second member 20 may both be provided with snow stoppers. In this case, directionality can be eliminated when attaching the snow drop prevention tool 1, thereby further facilitating the attachment process.

In the above embodiment, the second coupling section 23 extends above the first coupling section 13. However, the configuration is not limited to this. The second coupling section 23 may extend below the first coupling section 13. In this case, the female threaded hole is provided in the second coupling section, and the long hole is provided in the first coupling section.

Furthermore, in the above embodiment, the first coupling section 13 and the second coupling section 23 extend from intermediate locations of the first upright wall 11 and the second upright wall 21 in the up-down direction. However, the configuration is not limited to this. The second coupling section 23 may be set at the same height as the second securing section 22. It is desirable that the first coupling section 13 and the second coupling section 23 are respectively located above the center of the first upright wall 11 and the center of the second upright wall 21 in the up-down direction. Moreover, when the snow drop prevention tool 1 is attached to the first frame 50A and the second frame 50B, it is desirable that the first coupling section 13 and the second coupling section 23 are provided so as to be respectively located above the center of the first frame 50A and the center of the second frame 50B in the up-down direction. Accordingly, the first coupling section 13 and the second coupling section 23 are provided in areas near the upper ends of the first upright wall 11 and the second upright wall 21, so that when the lower ends of the first member 10 and the second member 20 are brought closer to each other by largely loosening the bolt 30, the distance between the lower ends can be further increased.

In the above embodiment, the adhesive member 40 is a butyl rubber sheet as an example. However, the configuration is not limited to this. The adhesive member 40 may be, for example, double-sided adhesive tape or a bonding agent. The adhesive member 40 may be bonded to the second upright wall 21 of the second member 20 at a construction site where the snow drop prevention tool 1 is to be attached.

What is claimed is:

1. A snow drop prevention structure comprising a snow drop prevention tool attached on a rooftop on which solar battery panels are installed, wherein the solar battery panels disposed adjacent to each other on the rooftop comprise a solar battery panel disposed at an eave side and a solar battery panel disposed at a ridge side, and a first frame and a second frame are fixed to a roof surface such that a gap is formed between the first frame and the second frame and below bottom surfaces of the first frame and the second frame, the first frame holding a ridge-side edge of the solar battery panel disposed at the eave side, the second frame holding an eave-side edge of the solar battery panel disposed at the ridge side, wherein the snow drop prevention tool comprises:

a first member having a first upright wall extending downward along a side surface of the first frame from an area at an equal height as an upper end of the first frame, a first securing section that extends above the first frame from an upper edge of the first upright wall and that is in abutment with a top surface of the first frame, a first coupling section extending toward an opposite side of the first securing section from the first upright wall, and a snow stopper protruding upward from the first securing section;

a second member having a second upright wall extending from an area at an equal height as an upper end of the second frame to an area below the second frame along a side surface of the second frame, a second securing section that extends above the second frame from an upper edge of the second upright wall and that is in abutment with a top surface of the second frame, a second coupling section extending toward an opposite side of the second securing section from the second upright wall and extending above or below the first coupling section, and a bottom extending section extending below the second frame from a lower edge of the second upright wall; and a bolt that fastens the first coupling section of the first member and the second coupling section of the second member to each other from above, wherein if the second coupling section extends above the first coupling section, the first coupling section is provided with a female threaded hole to which a male threaded section of the bolt is screwed, the second coupling section is provided with a long hole through which the male threaded section is inserted, and the long hole is long in a direction in which the second coupling section extends from the second upright wall, and wherein if the second coupling section extends below the first coupling section, the second coupling section is provided with the female threaded hole to which the male threaded section of the bolt is screwed, the first coupling section is provided with the long hole through which the male threaded section is inserted, and the long hole is long in a direction in which the first coupling section extends from the first upright wall.

2. The snow drop prevention structure according to claim 1, wherein the snow drop prevention tool further comprises an adhesive member that bonds the second upright wall of the second member and the side surface of the second frame to each other.

3. A snow drop prevention tool comprising:

a first member having a first upright wall extending in an up-down direction, a first securing section extending from an upper edge of the first upright wall, a first coupling section extending toward an opposite side of the first securing section from the first upright wall, and a snow stopper protruding upward from the first securing section;

a second member having a second upright wall extending in the up-down direction with a distance from the first upright wall, a second securing section extending toward an opposite side of the first upright wall from an upper edge of the second upright wall, a second coupling section extending above or below the first coupling section from the second upright wall, and a bottom extending section extending in an identical direction as the second securing section from a lower edge of the second upright wall; and a bolt that fastens the first coupling section of the first member and the second coupling section of the second member to each other from above, wherein if the second coupling section extends above the first coupling section, the first coupling section is provided with a female threaded hole to which a male threaded section of the bolt is screwed, the second coupling section is provided with a long hole through which the male threaded section is inserted, and the long hole is long in a direction in which the second coupling section extends from the second upright wall, and wherein if the second coupling section extends below the first coupling section, the second coupling section is provided with the female threaded hole to which the male threaded section of the bolt is screwed, the first coupling section is provided with the long hole through which the male threaded section is inserted, and the long hole is long in a direction in which the first coupling section extends from the first upright wall.

* * * * *